(12) United States Patent
Cao et al.

(10) Patent No.: US 9,690,359 B2
(45) Date of Patent: Jun. 27, 2017

(54) POWER MULTIPLEXER FOR INTEGRATED CIRCUIT POWER GRID EFFICIENCY

(71) Applicant: QUALCOMM Incorporated, San Diego, CA (US)

(72) Inventors: Lipeng Cao, La Jolla, CA (US); Tauseef Kazi, San Diego, CA (US); Alain Dominique Artieri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 14/836,694

(22) Filed: Aug. 26, 2015

(65) Prior Publication Data

US 2017/0060224 A1 Mar. 2, 2017

(51) Int. Cl.
 *G06F 1/32* (2006.01)
 *G06F 1/26* (2006.01)

(52) U.S. Cl.
 CPC ............ *G06F 1/3275* (2013.01); *G06F 1/263* (2013.01); *G06F 1/3203* (2013.01)

(58) Field of Classification Search
 None
 See application file for complete search history.

(56) References Cited

U.S. PATENT DOCUMENTS

| | | | |
|---|---|---|---|
| 5,193,198 | A | 3/1993 | Yokouchi |
| 6,914,844 | B2 | 7/2005 | Suh |
| 8,166,221 | B2 | 4/2012 | Lee et al. |
| 8,327,173 | B2 | 12/2012 | Hendin et al. |
| 8,762,753 | B2 | 6/2014 | Abhishek et al. |
| 2003/0233588 | A1 | 12/2003 | Verdun |
| 2013/0328613 | A1* | 12/2013 | Kay ..................... H03K 17/687 327/427 |

OTHER PUBLICATIONS

International Search Report and Written Opinion—PCT/US2016/043416—ISA/EPO—Sep. 28, 2016.

* cited by examiner

*Primary Examiner* — Paul Yanchus, III
(74) *Attorney, Agent, or Firm* — Haynes and Boone, LLP

(57) ABSTRACT

An integrated circuit is provided with a low-power island including embedded memory power domains that may selectively couple to either an active-mode power supply voltage supplied on a first power rail or to a sleep-mode power supply voltage supplied on a second power rail.

15 Claims, 3 Drawing Sheets

POWER MULTIPLEXER FOR INTEGRATED CIRCUIT POWER GRID EFFICIENCY

TECHNICAL FIELD

This relates to integrated circuit power management, and more particularly to a power multiplexer for increased integrated circuit power efficiency.

BACKGROUND

System on a chip (SoC) integrated circuits include assorted subsystems. For example, a smart phone SoC may integrate a modem, a graphics processor, Bluetooth, WiFi, and other subsystems. Each of these subsystems will typically have different timing requirements with regard to entering sleep mode, active mode, or shutdown as compared to the timing requirements for the SoC processor. Given these different timing requirements, it is conventional to power the subsystems independently from the SoC processor. For example, the subsystems may be organized into a "low-power island" powered by two power rails: an island embedded memory (MX) power rail and an island core logic (CX) power rail. The processor would similarly be powered by a processor CX power rail and a processor MX power rail.

Each MX power rail provides the power supply voltage to the various embedded memories within a corresponding embedded memory power domain. The island MX power rail thus provides power to an island embedded memory power domain within the low-power island. Similarly, the processor MX power rail provides power to a processor embedded memory power domain for the SoC processor. In contrast, each CX power rail provides the power supply voltage to the core logic within a corresponding core logic power domain. The island CX power rail thus provides the power supply voltage to the core logic within an island core logic power domain in the low-power island whereas the processor CX power rail provides the power supply voltage to the core logic for the SoC processor. In general, the voltage levels required by the embedded memory power domains are different from those for the core logic power domains. For example, embedded memories require a higher power supply voltage to retain their stored values in the sleep mode as compared to the reduced power supply voltage for powering the logic gates in a sleep mode. If a common power rail were used for both the embedded memories and the core logic, the core logic would waste power during the sleep mode from, for example, unnecessary leakage current loss due to the elevated power supply voltage that would be required to maintain the stored states in the embedded memories. Having independent memory and core logic power domains thus saves power. However, the power grid formed by the conventional memory and core logic power domains faces several challenges that may be better appreciated through the following discussion of a conventional SoC 100 as shown in FIG. 1.

SoC 100 includes a low-power island 110 that includes corresponding subsystems. For example, low-power island 110 may include a sensor sub-system 114 that includes an island CX power domain 111 powered by an island CX power rail 115. In addition, low-power island 110 includes an MX power domain 112 powered by an island embedded memory (MX) power rail 120. An SoC processor (not illustrated) in the remainder of SoC 100 includes an SoC MX power domain 120 powered by an SoC MX power rail 130. A CX power domain and corresponding CX power rail for the SoC processor is not shown for illustration clarity. A power management integrated circuit (PMIC) 105 powers the various power rails within SoC 100. For example, PMIC 105 includes a dedicated switch-mode power supply (MX SMPS) 135 to provide power to SoC MX power rail 130. But switch-mode power supplies are relatively expensive in terms of die area demands so an island SMPS 140 is shared by both island CX power rail 115 and island MX power rail 120. Since the island MX and CX power supply voltages may be different as discussed above, each power rail 115 and 120 couples to island SMPS 140 through a corresponding island linear drop-out regulator (LDO) 150 and 145, respectively. Since each island power rail 115 and 120 has its own corresponding island LDO, their voltages may be independently controlled despite being commonly powered by island SMPS 140. Low-power island 110 is advantageous in that its island power rails 115 and 120 may be placed into sleep mode while the SoC processor is still in active mode. In this fashion, power is not needlessly wasted with regard to supplying low-power island 110 with active-level power supply voltages simply because the SoC processor is active.

Island CX power rail 115 may be completely collapsed (discharged to ground) in the sleep mode. In contrast, island MX power domain 112 would lose its state if the MX power supply voltage on island MX power rail 120 were collapsed during sleep mode. Thus, the MX power supply voltage is maintained at a retention level during the sleep mode for low-power island 110. The MX power supply voltage carried on island MX power rail 120 must thus transition from the active mode power supply voltage level to the retention power supply voltage level when low-power island 110 transitions into the sleep mode. But note that island CX power rail 115, island MX power rail 120 (as well as SoC MX power rail 130) each requires a decoupling capacitor (C) to provide instantaneous power should the corresponding CX or MX power domain suddenly demand power. The capacitances of these decoupling capacitors is relatively large so that the instantaneous power demands may be met. A relatively large amount of charge must thus be discharged to ground from island MX power rail 120 when low-power island 110 transitions to the sleep mode, which reduces battery life accordingly. In addition, island MX LDO 145 wastes power when converting an active-mode power supply voltage from island SMPS 140 to the retention voltage for island MX power rail 120. Another problem with regard to SoC 100 is that the efficiency of a switch-mode power supply such as SMPS 140 tends to drop dramatically at the reduced current output levels associated with the sleep mode of operation for low-power island 110. The reduced power grid efficiency can be quite dramatic.

Accordingly, there is a need in the art for improved power architectures for integrated circuits including independently-powered subsystems.

SUMMARY

A low-power island is provided that includes at least one subsystem. Each subsystem includes an embedded memory (MX) power domain having a power supply node. Each subsystem associates with a corresponding power multiplexer that couples a selected one of an active-mode MX power rail and a sleep-mode MX power rail to a power supply node for the subsystem's embedded memory power domain. A power source such as a power management integrated circuit powers the active-mode MX power rail with an active-mode MX power supply voltage. Similarly, the power source powers the sleep-mode MX power rail with a sleep-mode MX power supply voltage that is less than the active-mode MX power supply voltage.

Each power multiplexer may select for the active-mode MX power rail while the corresponding subsystem operates in an active mode. Conversely, each power multiplexer may select for the sleep-mode MX power rail while the corresponding subsystem operates in a sleep mode. Since the sleep-mode MX power supply voltage and the active-mode MX power supply voltage need not be changed during shifts between the active mode and the sleep mode, there is no waste of power on associated decoupling capacitors for the corresponding power rails during these mode transitions.

The sleep-mode MX power rail may also power an embedded memory power domain outside of the low-power island such as a processor embedded memory power domain. This aggregation of the low-power island memory power domains with the processor embedded memory power domain improves the efficiency of a switch-mode power supply supplying power to the sleep-mode MX power rail.

These and additional advantageous features may be better appreciated with regard to the following detailed description of example implementations.

BRIEF DESCRIPTION OF THE DRAWINGS

Aspects of the present disclosure and their advantages are best understood by referring to the detailed description that follows. It should be appreciated that like reference numerals are used to identify like elements illustrated in one or more of the figures.

DETAILED DESCRIPTION

Figure 1:
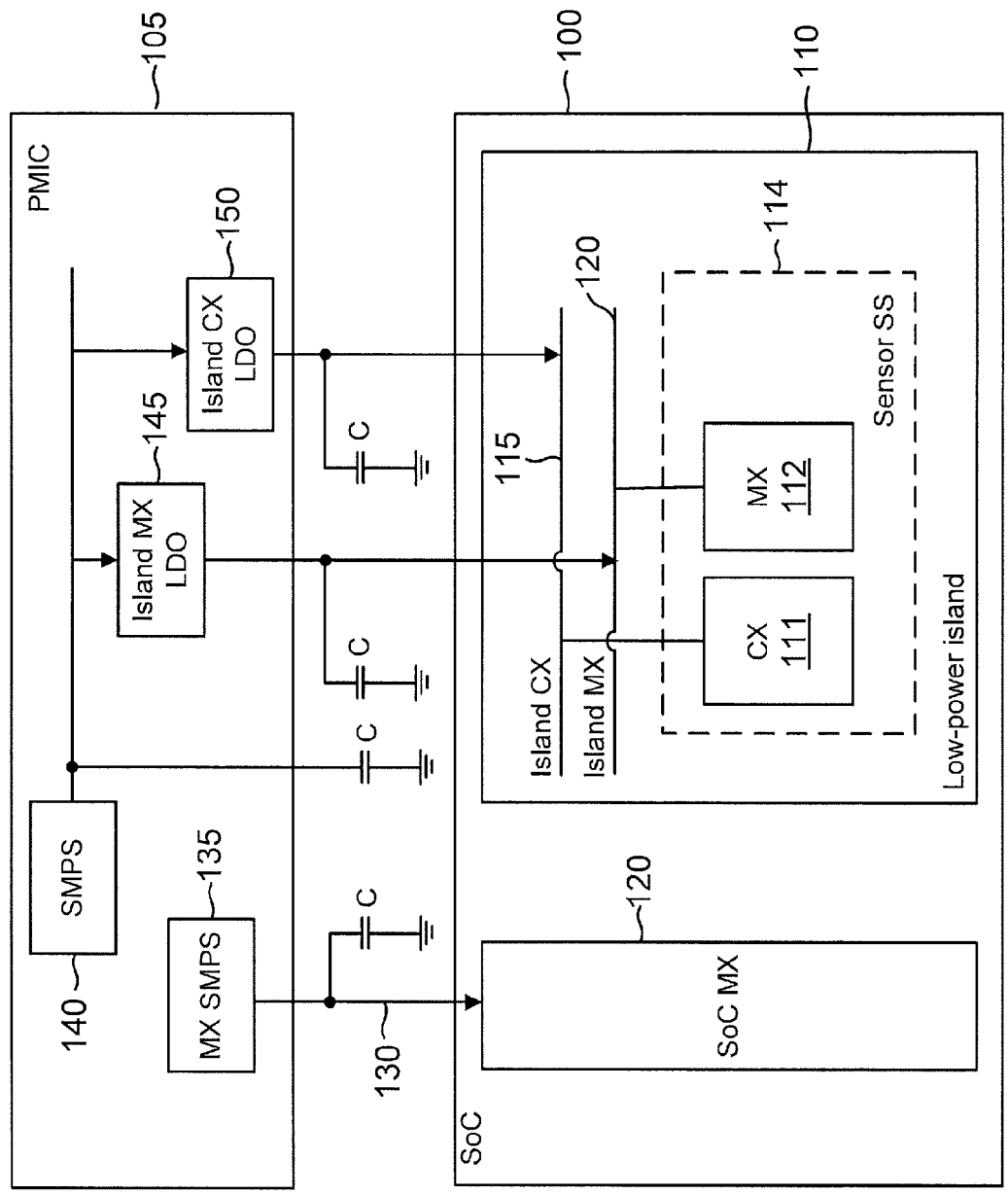
FIG. 1 is a block diagram of a conventional SoC integrated circuit including a low-power island.
Figure 2:
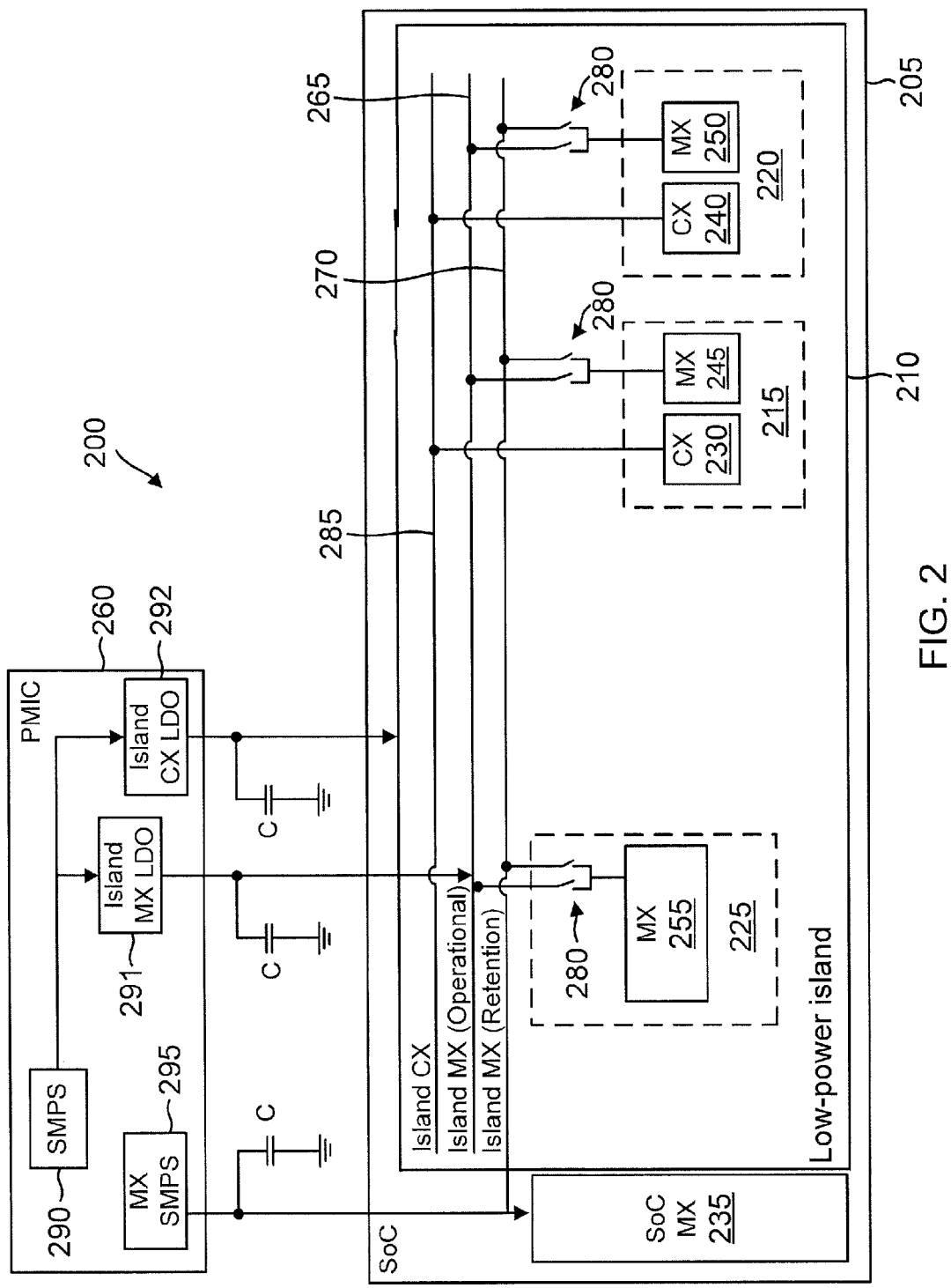
FIG. 2 is a block diagram of an SoC integrated circuit including a low-power island in accordance with an aspect of the disclosure.
Figure 3:
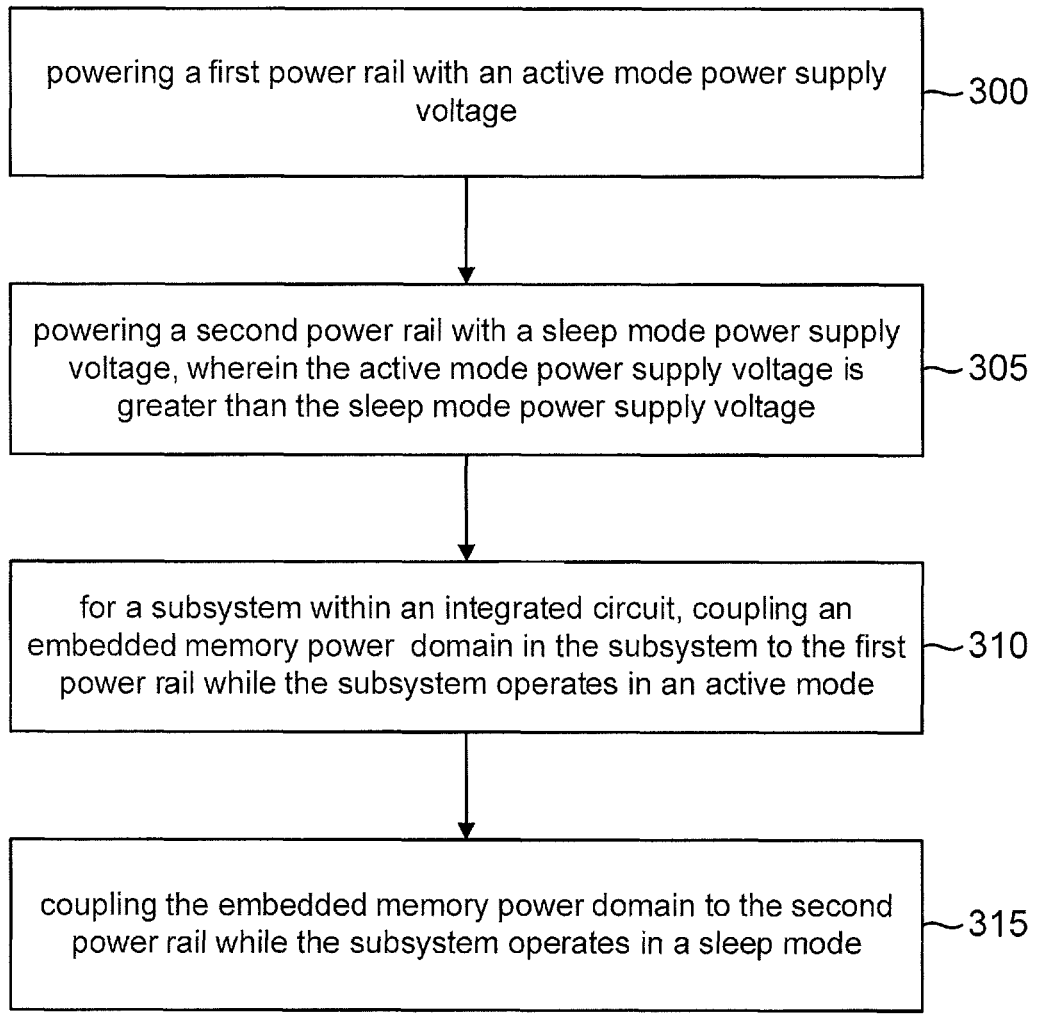
FIG. 3 is a flow chart for a method of operation for an SoC including a low-power island in accordance with an aspect of the disclosure.

An example system 200 with a power grid architecture that addresses the problems associated with conventional independent power domains is shown in FIG. 2. System 200 includes an integrated circuit such as a system-on-a-chip (SoC) 205 in which a low-power island 210 includes one or more subsystems. For example, low-power island 210 may include a sensor subsystem 215, a wireless interface subsystem 220, and an always-on power management (AOP) subsystem 225. Each subsystem includes a core logic (CX) power domain such as illustrated by island CX power domains 230 and 240 in subsystems 215 and 220, respectively. For illustration clarity, an island CX domain in AOP subsystem 225 is not shown in FIG. 2. Each subsystem 215, 220, and 220 also includes an island embedded memory (MX) power domain 245, 250, and 255, respectively. SoC 205 also includes an SoC processor (not illustrated) with an SoC embedded memory (MX) power domain 235. As discussed with regard to FIG. 1, the various MX power domains in low-power island 210 are not powered by the same power supply voltage as the CX power domains because the island MX power domains retain their state during a sleep mode. In contrast, the power supply voltages for the island CX power domains in low-power island 210 may be completely discharged to ground during the sleep mode. However, it will be appreciated that the island CX power domains may remain powered during the sleep mode in alternative implementations.

To address the shortcoming of conventional low-power island architectures such as discussed with regard to FIG. 1, each MX domain in low-power island 210 may selectively couple to one of two power rails through a corresponding power multiplexer 280. If a subsystem is in an active mode (operational) of operation, its power multiplexer 280 selects for an active-mode MX power rail 265 that supplies an active-mode MX power supply voltage. In contrast, if a subsystem is in a sleep mode (retention) of operation, its power multiplexer 280 selects for a sleep-mode MX power rail 270 that supplies a sleep-mode MX power supply voltage. These power supply voltages will vary depending upon the requirements of a particular process node but the sleep-mode MX power supply voltage is lower than the active-mode MX power supply voltage across the various process nodes.

In contrast to the island MX power domains, each CX power domain in low-power island 210 such as CX power domains 230 and 240 couples directly to an island CX power rail 285. In that regard, note that the power supply voltage for island CX power rail 285 may be completely collapsed (discharged to ground) during a sleep mode for low-power island 210. In such implementations, there is thus no need for a power multiplexer for island CX power domains 230 and 240 since island CX power rail 285 may be discharged to ground during the sleep mode. But such a discharge is undesirable for the island MX power domains because they need to retain their state during the sleep (retention) mode of operation. In contrast to conventional architectures such as discussed with regard to FIG. 1, a decoupling capacitor (C) for active-mode MX power rail 265 does not needlessly discharge to ground when low-power island 210 switches from the active mode to the sleep mode because the active-mode MX power supply voltage supplied by active-mode MX power rail 265 does not change in response to such mode shifts. The corresponding decoupling capacitor C (or capacitors) for active-mode MX power rail 265 will thus not waste charge during the mode transitions from active mode to sleep mode for subsystems within low-power island 210. Similarly, a decoupling capacitor C for sleep-mode MX power rail 270 need not be discharged to ground during the mode transitions.

To eliminate the power grid efficiency issues that conventional integrated circuit power grid architectures have when a switch-mode power supply must support a relatively low amount of output current during the sleep mode, sleep-mode MX power rail 270 may also supply power to SoC MX power domain 235. A power management integrated circuit (PMIC) 260 includes a switch-mode power supply 295 for powering sleep-mode MX power rail 270. Although the current drawn by any given MX power domain during the sleep mode is relatively small, the aggregation of SoC MX power domain 235 with island MX power domains 245, 250, and 255 with respect to being powered by sleep-mode MX power rail 270 greatly improves the efficiency of switch-mode power supply 295 as compared to the efficiency of conventional switch-mode power supply 135 during the sleep mode. In particular, note that only the low-power island MX power domains are powered by switch-mode power supply 135 in conventional SoC 100 during the sleep mode whereas all the MX power domains across SoC 205 may be powered by switch-mode power supply 295 during the sleep mode. Thus, switch-mode power supply 295 operates at higher efficiency due to its larger output current in the sleep mode as compared to conventional architectures.

An island switch-mode power supply 290 in PMIC 260 powers island CX power rail 285 and active-mode MX power rail 265 through island linear drop-out regulators 292 and 291, respectively. This is advantageous as compared to conventional architectures since there is no linear drop-out regulator power loss with regard to down converting an active mode power supply voltage into a sleep-mode power supply voltage. In contrast, note that linear drop-out regulator 145 in conventional SoC 100 of FIG. 1 wastes power during the sleep mode because it must drop the active-mode power supply voltage from switch-mode power supply 140 to the sleep-mode power supply voltage. In addition, power multiplexers 280 allow the various subsystems in low-power island 210 to independently operate in the active and sleep modes. In this fashion, power is not wasted by needlessly supplying an active-mode power supply voltage to a dormant subsystem merely because another subsystem is in the active mode of operation. In addition, the transition from sleep mode to active mode for a dormant subsystem merely requires its power multiplexer 280 to select for active-mode MX power rail 265. This reduces the latency with regard to waking up into the active mode and thus conserves additional power as compared to conventional architectures.

Each power multiplexer 280 may comprise any suitable set of switches such as a parallel arrangement of PMOS transistors. Alternatively, transmission gates may also be used to form power multiplexers 280. In some implementations, the plurality of power multiplexers 280 may be deemed to comprise a means for selectively coupling active ones of the island embedded memory (MX) power domains to active-mode MX power rail 265 and for selectively coupling dormant ones of the island embedded memory (MX) power domains to sleep-mode MX power rail 270. With regard to controlling power multiplexer 280, a suitable control circuit such as always-on subsystem 225 may control their operation. Alternatively, the SoC processor or an SoC state machine (not illustrated) may control power multiplexers 280.

Regardless of where the controller for power multiplexers 280 is located, it may be configured to prevent the simultaneous coupling of both sleep-mode MX power rail 270 and active-mode MX power rail 265 to any given island MX domain because such simultaneous coupling could cause active-mode MX rail 265 to undesirably discharge to sleep-mode MX rail 270. Thus, each power multiplexer 280 may be controlled to temporarily disengage the power supply node to its corresponding MX power domain from both active-mode MX power rail 265 and sleep-mode MX power rail 270 during any mode transition (either active mode to sleep mode or sleep mode to active mode). The disengagement period may be relatively brief (e.g., tens of nanoseconds) such that the corresponding MX power domain can continue to operate off the residual voltage on its power supply node until power multiplexer 280 engages to the desired power rail.

A method of operation for a low-power island will now be discussed. The method includes an act 300 of powering a first power rail with an active mode power supply voltage as well as an act 305 of powering a second power rail with a sleep mode power supply voltage, wherein the active mode power supply voltage is greater than the sleep mode power supply voltage. The powering of active-mode MX power rail 265 is an example of act 300 whereas the powering of sleep-mode MX power rail 270 is an example of act 305.

The method further comprises an act 310 that is performed for a subsystem within an integrated circuit and comprises coupling an embedded memory power domain in the subsystem to the first power rail while the subsystem operates in an active mode. The selection of active-mode MX power rail 265 by one of the power multiplexers 280 is an example of act 310.

Finally, the method also includes an act 315 that comprises coupling the embedded memory power domain to the second power rail while the subsystem operates in a sleep mode. The selection of sleep-mode MX power rail 270 by one of the power multiplexers 280 is an example of act 315.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

What is claimed is:

1. An integrated circuit; comprising
a low power island core logic power rail configured to supply a low power island core logic power supply voltage;
a first power rail configured to supply an active-mode power supply voltage;
a second power rail configured to supply a sleep-mode power supply voltage, wherein the active-mode power supply voltage is greater than the sleep-mode power supply voltage;
a plurality of subsystems, each subsystem having an embedded memory including a power supply node, a power multiplexer coupled between the power supply node and the first power rail and the second power rail, and a subsystem core logic power domain coupled to the low power island core logic power rail, wherein each subsystem's power multiplexer is configured to select for the first power rail during an active mode of operation for the subsystem's embedded memory, and wherein the subsystem's power multiplexer is further configured to select for the second power rail during a sleep mode of operation for the subsystem's embedded memory; and
a processor including a processor core logic domain powered independently from the power island core logic power rail, the processor including an embedded memory power domain configured to be powered by the second power rail during a sleep mode for the processor.

2. The integrated circuit of claim 1, wherein the integrated circuit is incorporated into a system including a power management integrated circuit (PMIC) comprising:
a first switch-mode power supply configured to supply the sleep-mode power supply voltage to the second power rail.

3. The integrated circuit of claim 1, wherein each subsystem is configured to independently enter the sleep mode and the active mode.

4. The integrated circuit of claim 1, wherein the plurality of subsystems includes at least one sensor subsystem.

5. The integrated circuit of claim 1, wherein the plurality of subsystems includes at least one wireless interface subsystem.

6. The integrated circuit of claim 2, wherein the PMIC further comprises:

a second switch-mode power supply configured to supply an output voltage;

a first linear drop-out regulator configured to convert the output voltage into the power island core logic power supply voltage to power the low power island core logic power rail; and a second linear drop-out regulator configured to convert the output voltage into the active-mode power supply voltage to power the first power rail.

7. The integrated circuit of claim 1, wherein the power multiplexer comprises a pair of PMOS transistors.

8. The integrated circuit of claim 1, further comprising a controller configured to control the power multiplexers such that each power multiplexer disengages temporarily from the first power rail and from the second power rail when the corresponding subsystem switches between the active mode and the sleep mode.

9. The integrated circuit of claim 2, further comprising a first decoupling capacitor coupled to the first power rail and a second decoupling capacitor coupled to the second power rail.

10. A method, comprising:

powering a first power rail of a low-power island of an integrated circuit with an active mode power supply voltage;

powering a second power rail of the low-power island with a sleep mode power supply voltage, wherein the active mode power supply voltage is greater than the sleep mode power supply voltage;

for a plurality of subsystem within the low-power island, wherein each subsystem includes a subsystem core logic power domain powered by a low power island core logic power supply voltage, coupling an embedded memory power domain in each subsystem to the first power rail while the subsystem operates in an active mode;

coupling the embedded memory power domain in each subsystem to the second power rail while the subsystem operates in a sleep mode and the low power island core logic power supply voltage is discharged to ground; and powering a processor embedded memory for a processor within the integrated circuit with the sleep mode power supply voltage from the second power rail while the processor operates in a sleep mode, wherein a processor core logic power domain for the processor is powered independently from the low power island core logic power supply voltage.

11. The method of claim 10, further comprising temporarily decoupling both the second power rail and the first power rail from the embedded memory power domain in a transitioning one of the subsystems in the integrated circuit when the transitioning subsystem transitions between the active mode and sleep mode.

12. The method of claim 10, further comprising powering the second power rail directly through a switch-mode power supply.

13. An integrated circuit, comprising:

a power island core logic power rail configured to supply a power island core logic power supply voltage;

a first power rail configured to supply an active-mode power supply voltage;

a second power rail configured to supply a sleep-mode power supply voltage, wherein the active-mode power supply voltage is greater than the sleep-mode power supply voltage;

a plurality of subsystems, each subsystem including a subsystem core logic domain coupled to the power island core logic power rail and including a memory power domain having one or more embedded memories;

means for selectively coupling active ones of the memory power domains to the first power rail and for selectively coupling dormant ones of the memory power domains to the second power rail; and a processor including a processor core logic domain powered independently from the power island core logic power rail, the processor including an embedded memory configured to be powered by the sleep memory power rail during a sleep mode for the processor.

14. The integrated circuit of claim 13, wherein the integrated circuit is incorporated in a system including a switch-mode power supply configured to power the second power rail with the sleep-mode power supply voltage.

15. The integrated circuit of claim 13, wherein the plurality of subsystems includes at least one sensor subsystem.

* * * * *